US007876810B2

(12) United States Patent
McCloud et al.

(10) Patent No.: US 7,876,810 B2
(45) Date of Patent: Jan. 25, 2011

(54) SOFT WEIGHTED INTERFERENCE CANCELLATION FOR CDMA SYSTEMS

(75) Inventors: Michael L McCloud, Boulder, CO (US); Vijay Nagarajan, Boulder, CO (US)

(73) Assignee: Rambus Inc., Sunnyvale, CA (US)

( * ) Notice: Subject to any disclaimer, the term of this patent is extended or adjusted under 35 U.S.C. 154(b) by 807 days.

(21) Appl. No.: 11/266,928

(22) Filed: Nov. 4, 2005

(65) Prior Publication Data

US 2006/0227854 A1 Oct. 12, 2006

Related U.S. Application Data

(63) Continuation-in-part of application No. 11/233,636, filed on Sep. 23, 2005, and a continuation-in-part of application No. 11/100,935, filed on Apr. 7, 2005.

(51) Int. Cl.
*H04B 1/00* (2006.01)
(52) U.S. Cl. ............. 375/148; 375/254; 375/278; 375/285; 370/310; 370/347
(58) Field of Classification Search ............ 375/148
See application file for complete search history.

(56) References Cited

U.S. PATENT DOCUMENTS

| | | | |
|---|---|---|---|
| 5,553,062 A | 9/1996 | Schilling | |
| 6,175,588 B1 | 1/2001 | Visotsky | |
| 6,177,906 B1 * | 1/2001 | Petrus | 342/378 |
| 6,185,716 B1 * | 2/2001 | Riggle | 714/769 |
| 6,377,607 B1 * | 4/2002 | Ling et al. | 375/130 |
| 6,414,949 B1 | 7/2002 | Boulanger | |
| 6,449,246 B1 * | 9/2002 | Barton et al. | 370/210 |
| 6,466,611 B1 | 10/2002 | Bachu | |
| 6,522,683 B1 | 2/2003 | Smee | |
| 6,570,919 B1 | 5/2003 | Lee | |
| 6,687,723 B1 | 2/2004 | Ding | |
| 6,690,723 B1 | 2/2004 | Gosse | |
| 6,724,809 B2 | 4/2004 | Reznik | |
| 6,754,340 B1 | 6/2004 | Ding | |
| 6,829,313 B1 * | 12/2004 | Xu | 375/341 |
| 6,839,390 B2 | 1/2005 | Mills | |
| 6,931,052 B2 | 8/2005 | Fuller | |
| 6,956,893 B2 | 10/2005 | Frank | |
| 6,963,546 B2 | 11/2005 | Misra | |

(Continued)

OTHER PUBLICATIONS

H.Yan et. al, "Parallel Interference Cancellation for Uplink Multirate Overlay CDMA Channels," IEEE Trans. Comm, V 53, No. 1, Jan. 2005, pp. 152-161.

(Continued)

*Primary Examiner*—Shuwang Liu
*Assistant Examiner*—Lihong Yu
(74) *Attorney, Agent, or Firm*—Barcelo, Harrison & Walker, LLP

(57) ABSTRACT

Interference is cancelled from a baseband signal by synthesizing interference from estimated symbols in interfering subchannels. The estimated symbols are hard-coded, soft weighted, or zeroed, depending on the value of an estimated pre-processed signal-to-interference-and-noise ratio (SINR) in each subchannel in order to maximize a post-processed SINR. The estimated pre-processed SINR is obtained from averages of estimated symbol energies and estimated noise variances, or from related statistical procedures.

68 Claims, 4 Drawing Sheets

U.S. PATENT DOCUMENTS

| | | | |
|---|---|---|---|
| 6,975,669 | B2 | 12/2005 | Ling |
| 6,975,671 | B2 | 12/2005 | Sindhushayana |
| 7,010,073 | B2 * | 3/2006 | Black et al. .................. 375/355 |
| 7,027,533 | B2 * | 4/2006 | Abe et al. .................... 375/341 |
| 2002/0060999 | A1 | 5/2002 | Ma |
| 2002/0131534 | A1 | 9/2002 | Ariyoshi |
| 2002/0154717 | A1 | 10/2002 | Shima |
| 2003/0005009 | A1 | 1/2003 | Usman |
| 2003/0012264 | A1 | 1/2003 | Papasakellariou |
| 2003/0095590 | A1 | 5/2003 | Fuller |
| 2003/0156630 | A1 | 8/2003 | Sriram |
| 2003/0210667 | A1 | 11/2003 | Zhengdi |
| 2003/0219085 | A1 | 11/2003 | Endres |
| 2004/0008765 | A1 | 1/2004 | Chung |
| 2004/0013190 | A1 | 1/2004 | Jayaraman |
| 2004/0076224 | A1 | 4/2004 | Onggosanusi |
| 2004/0161065 | A1 | 8/2004 | Buckley |
| 2004/0190601 | A1 | 9/2004 | Papadimitriou |
| 2004/0264552 | A1 | 12/2004 | Smee |
| 2005/0084045 | A1 | 4/2005 | Stewart |
| 2005/0111566 | A1 * | 5/2005 | Park et al. ................... 375/267 |
| 2005/0129107 | A1 | 6/2005 | Park |
| 2005/0223049 | A1 | 10/2005 | Regis |
| 2005/0243908 | A1 | 11/2005 | Heo |
| 2005/0259770 | A1 | 11/2005 | Chen |
| 2006/0007895 | A1 | 1/2006 | Coralli |
| 2006/0013289 | A1 | 1/2006 | Hwang |

OTHER PUBLICATIONS

K. Hooli, et. al, "Chip-Level Channel Equalization in WCDMA Downlink," EURASIP Journal on Applied Signal Processing 2002:8, pp. 757-770.

J.Winters, "Optimal Combining in Digital Mobile Radio with Cochannel Interference," IEEE J. Selected Areas in Comm., V SAC-2, No. 4, Jul. 1984, pp. 528-539.

M.Ali-Hackl, et. al, "Error Vector Magnitude as a Figure of Merit for CDMA Receiver Design," The Fifth European Wireless Conference, Feb. 24-27, 2004.

D. Athanasios, et al, "SNR Estimation Algorithms in AWGN for HiperLAN/2 Transceiver," MWCN 2005 Morocco, Sep. 19-21, 2005.

D.Divsalar, "Improved Parallel Interference Cancellation for CDMA," IEEE Trans. Comm., V 46, No. 2, Feb. 1998, pp. 258-268.

T.Lim,S.Roy, "Adaptive filters in multiuser (MU) CDMA detection," Wireless Networks 4 (1998) pp. 307-318.

D.Guo, et. al, "A Matrix-Algebraic Approach to Linear Parallel Interference Cancellation in CDMA," IEEE Trans Comm, V. 48, No. 1, Jan. 2000, pp. 152-161.

L.Rasmussen, et. al, "A Matrix-Algebraic Approach to Successive Interference Cancellation in CDMA," IEEE Trans Comm, V. 48, No. 1, Jan. 2000, pp. 145-151.

D.Guo, et. al, "Linear Parallel Interference Cancellation in Long-Code CDMA Multiuser Detection," IEEE J. Sel. Areas Comm., V. 17, No. 12, Dec. 1999, pp. 2074-2081.

G.Xue, et. al, "Adaptive Multistage Parallel Interference Cancellation for CDMA," IEEE Journal on Selected Areas in Communications, V. 17, No. 10, Oct. 1999, pp. 1815-1827.

Y.Guo, "Advanced MIMO-CDMA Receiver for Interference Suppression: Algorithms, System-on-Chip Architectures and Design Methodology," Doctoral Thesis, Rice University, May 2005, pp. 165-180.

J.Robler, et. al, "Matched-Filter- and MMSE-Based Iterative Equalization with Soft Feedback for QPSK Transmission," International Zurich Seminar on Broadband Communications (IZS '02) pp. 19-1-19-6, Feb. 2002.

H.Dai, et. al, "Iterative Space—Time Processing for Multiuser Detection in Multipath CDMA Channels," IEEE Trans. Signal Proc., V. 50, No. 9, Sep. 2002, pp. 2116-2127.

A.Yener, et. al, "CDMA Multiuser Detection: A Nonlinear Programming Approach," IEEE Trans. Comm, V. 50, No. 6, Jun. 2002, pp. 1016-1024.

A.Persson, et. al, "Time-Frequency Localized CDMA for Downlink Multi-Carrier Systems," 2002 IEEE 7th Int. Symp. Spread Spectrum, V. 1, 2002, pp. 118-122.

D. Brown, et. al, "On the Performance of Linear Parallel Interference Cancellation," IEEE Trans. Information Theory, V. 47, No. 5, Jul. 2001, pp. 1957-1970.

M. Kobayashi, et. al, "Successive Interference Cancellation with SISO Decoding and EM Channel Estimation," IEEE J. Sel. Areas Comm., V. 19, No. 8, Aug. 2001, pp. 1450-1460.

\* cited by examiner

SOFT WEIGHTED INTERFERENCE CANCELLATION FOR CDMA SYSTEMS

CROSS-REFERENCE TO RELATED APPLICATIONS

This application is a continuation-in-part of commonly owned and U.S. patent applications Ser. No. 11/100,935, filed Apr. 7, 2005 now abandoned, entitled "Construction Of Projection Operators for Interference Cancellation", and Ser. No. 11/233,636, filed Sep. 23, 2005, entitled "Optimal Soft Weighted Subtractive Cancellation for CDMA Systems".

BACKGROUND

1. Field of the Invention

The present invention relates generally to interference cancellation in received wireless communication signals and, more particularly, to forming a composite interference signal for interference cancellation.

2. Discussion of the Related Art

In an exemplary wireless multiple-access system, a communication resource is divided into subchannels and allocated to different users. For example, subchannels may include time slots, frequency slots, multiple-access codes, spatio-temporal subchannels, or any combination thereof. A plurality of subchannel signals received by a wireless terminal (e.g., a subscriber unit or a base station) may correspond to different users and/or different subchannels allocated to a particular user. In some systems, a plurality of subchannels may be allocated to at least one user such that the number of users is less than the number of subchannels.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into PN-coded subchannels in order to differentiate between users.

In a multipath environment, received signals are superpositions of time delayed (and complex scaled) versions of the transmitted signals. Multipath can cause co-channel and cross-channel interference that correlates the allocated subchannels. For example, co-channel interference may occur when time-delayed reflections of transmitted signals interfere with a line-of-sight signal from the same source. Cross-channel interference occurs when signals in a subchannel leak into and, thus, impair acquisition and tracking of other subchannels.

Co-channel and cross-channel interference can degrade communications by causing a receiver to incorrectly decode received transmissions, thus increasing a receiver's error floor. Interference may also have other degrading effects on communications. For example, interference may diminish the capacity of a communication system, decrease the region of coverage, and/or decrease maximum data rates. For these reasons, a reduction in interference can improve reception of selected signals by addressing the aforementioned limitations due to interference.

SUMMARY OF THE INVENTION

In view of the foregoing background, embodiments of the present invention may provide for identifying interference components for the purpose of forming a composite interference signal for use in any subtractive or projective interference canceller. The identification of interference components and the cancellation of such components may be implemented using a parallel, serial, iterative, or one-shot mode of operation.

Embodiments of the invention may be employed in any receiver configured to support one or more CDMA standards, such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) other CDMA standards.

Embodiments of the invention may provide for analytically characterizing the received signal-to-interference-and-noise ratio (SINR), estimating it in a composite signal or in an interfering user subchannel, and choosing feedback terms (e.g., adaptive weights from a companding function) to construct an interference-cancelled signal that maximizes this quantity. In one embodiment of the invention, a means for determining an SINR estimate in each subchannel uses an estimated SINR for each estimated symbol. In this case, each estimated symbol may be generated by a means for producing symbol estimates from a received baseband signal. Alternatively, symbol estimates may include resolutions of the baseband signal into multiple antenna copies, multipath components, or the like. A means for determining whether to use weighted soft decisions or hard decisions for each subchannel compares each subchannel's SINR estimate to a predetermined threshold. A means for generating hard decisions and/or weighted soft decisions for each symbol estimate produces either a hard estimate or a weighted soft estimate for each symbol estimate based on how the corresponding SINR estimate compares to the threshold. A means for producing a synthesized interference signal may synthesize a composite interference vector from the hard or soft-weighted symbol estimates. A means for emulating channel distortions in the synthesized interference signal may simulate channel effects corresponding to paths other than a predetermined path of interest. A means for producing an interference-cancelled signal combines a received baseband signal with the synthesized interference signal in order to subtract or project out interference in the received baseband signal, or in one or more rake-resolved components of the baseband signal.

The means for producing symbol estimates corresponding to a received baseband signal may include, by way of example, a rake receiver, a plurality of rake receivers coupled to a rake combiner, an equalizer, and/or any CDMA receiver employing antenna diversity, equalizers, and/or other elements of an advanced receiver.

The means for determining an SINR estimate in each subchannel may include, by way of example, an apparatus or method configured for filtering complex amplitudes and estimated variances of the complex amplitudes for each subchannel. The means for determining an SINR estimate may include an apparatus or process configured for calculating a mean-squared error due to noise plus interference or a component or method for computing a broadband noise plus interference floor.

The means for determining whether to use weighted soft decisions or hard decisions for each subchannel may include, by way of example, any apparatus or method configured for comparing estimated SINRs to at least one predetermined threshold.

The means for generating hard decisions and/or weighted soft decisions for each pre-processed symbol estimate may include, by way of example, an apparatus or method for generating hard decisions, an apparatus or method for generating weights on soft estimates, and/or an apparatus or method for discarding soft estimates with a low estimated SINR.

The means for producing a synthesized interference signal may include, by way of example, a CDMA signal generator configured for performing an inverse fast Walsh transform (IFWT), PN covering, pulse shaping, and channel emulation.

The means for emulating channel distortions may include, by way of example, an apparatus or method configured for convolving the synthesized interference signal with a channel profile, which in some cases, excludes channel effects corresponding to one or more predetermined paths or rake fingers of interest.

The means for producing an interference-cancelled signal may include, by way of example, a subtractive canceller, a weighted subtractive canceller, a projective canceller, and/or a weighted projective canceller.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the schematic block diagrams of FIGS. 1, 2A, and 2B, and the flow diagrams of FIGS. 3, 4A, and 4B. Various functional units depicted in the figures may take the form of a microprocessor, digital signal processor, application specific integrated circuit, field programmable gate array, or other logic circuitry programmed or otherwise configured to operate as described herein. Accordingly, embodiments shown herein may take the form of programmable features executed by a common processor or a discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
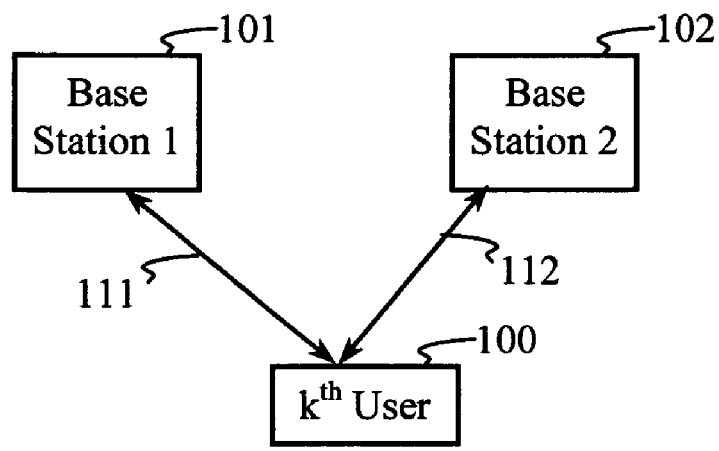
FIG. 1 is a system diagram illustrating a communication system configuration in which embodiments of the present invention may be configured to operate.

FIG. 1 shows an exemplary CDMA system configuration for the purpose of illustrating embodiments of the invention configured to perform soft-weighted subtractive cancellation. In the present example, a $k^{th}$ user terminal 100 receives communications from sources (e.g., base stations) 101 and 102 via signal paths 111 and 112, respectively. In an alternative embodiment not shown, the sources 101 and 102 may correspond to two propagation paths from one base station. The sources 101 and 102 employ orthogonalizing (e.g., Walsh) codes $W_j$ with PN/Scrambling code covers $P_j$, where j=1 or 2. The orthogonalizing codes spread the symbol transmission by a factor of N.

A data symbol for a $k^{th}$ user of a $j^{th}$ base-station may be represented by $a_{jk}$. A received signal r[n] at the $k^{th}$ user terminal 100 for an $n^{th}$ chip and a symbol duration that spans N chips is expressed by $$r[n] = c_1 P_1[n] \sum_{k=1}^{K_1} W_{1k}[n] a_{1k}[l] + c_2 P_2[n] \sum_{k=1}^{K_2} W_{2k}[n] a_{2k}[l] + u[n],$$

$$lN \le n \le (l+1)N - 1$$

where $W_{jk}[n]$ denotes the $n^{th}$ chip of the $k^{th}$ user from the $j^{th}$ source, and u[n] is additive white Gaussian noise of variance $\sigma_u^2$. Although this exemplary embodiment excludes pulse-shape filtering effects, alternative embodiments that consider pulse shaping may be provided. The variables $K_1$ and $K_2$ denote the number of user channels multiplexed by the $1^{st}$ and $2^{nd}$ transmit sources, respectively. If both sources correspond to the same base station, then $K_1 = K_2$. The values $c_j$ are complex channel gains corresponding to the signal from the $j^{th}$ base station to the receiver. Although a single path per base station is described, embodiments of the invention may be configured to account for multiple paths from each base station.

If the first base station 101 transmits a signal of interest, then transmissions from the second base station 102 may comprise interference. Interference cancellation, such as subtractive and/or projective cancellation may be employed. According to one aspect of the present invention, a receiver may synthesize interference from a combination of soft-weighted and hard-coded pre-processed symbol estimates. A synthesized interference signal $s_2[n]$ corresponding to the second base station 102 may be expressed by $$s_2[n] = c_2 P_2[n] \sum_{k=1}^{K_2} W_{2k}[n] \lambda_{2k}(\tilde{a}_{2k}[l]) \tilde{a}_{2k}[l], \, lN \le n \le (l+1)N - 1$$

where $\tilde{a}_{2k}[l]$ is a pre-processed soft estimate of a $k^{th}$ user's symbol on symbol period l, and $\lambda_{2k}(\tilde{a}_{2k}[l])$ is a companding function acting on the estimated symbol $\tilde{a}_{2k}[l]$. Although the expression for the synthesized interference $s_2[n]$ may assume perfect channel estimates $c_2$, uncertainty in the channel estimates may be factored into the functions $\lambda_{2k}(\tilde{a}_{2k}[l])$. The receiver may subtract the synthesized interference $s_2[n]$ from the received signal $r[n]$. An interference-cancelled version of the first path 111, $\hat{r}_1$, is given by $$\hat{r}_1[n] = r[n] - s_2[n] = c_1 P_1[n] \sum_{k=1}^{K_1} W_{1k}[n] a_{1k}[l] +$$

$$c_2 P_2[n] \sum_{k=1}^{K_2} W_{2k}[n] (a_{2k}[l] - \lambda_{2k}(\tilde{a}_{2k}[l]) \tilde{a}_{2k}[l]) + u[n]$$

Each chip of a corresponding PN-stripped output $x_1[n]$ is given by $$x_1[n] = P_1^*[n] \hat{r}_1[n] = c_1 \sum_{k=1}^{K_1} W_{1k}[n] a_{1k}[l] +$$

$$c_2 P_1^*[n] P_2[n] \sum_{k=1}^{K_2} W_{2k}[n] (a_{2k}[l] - \lambda_{2k}(\tilde{a}_{2k}[l]) \tilde{a}_{2k}[l]) + P_1^*[n] u[n]$$

where * denotes a complex conjugate and the identity $P_1^*[n] P_1[n]=1$ is enforced. This step is followed by matching to an $m^{th}$ code for a user of interest. The result of this operation, $\hat{a}_{1m}$, is $$\hat{a}_{1m}[l] = \sum_{n=1}^{N} W_{1m}^*[n] x_1[n] = c_1 a_{1m}[l] +$$

$$c_2 \sum_{k=1}^{K_2} \rho_{mk} (a_{2k}[l] - \lambda_{2k}(\tilde{a}_{2k}[l]) \tilde{a}_{2k}[l]) + \sum_{n=1}^{N} W_{1m}^*[n] P_1^*[n] u[n]$$

where the orthogonality $$\sum_{n=1}^{N} W_{1m}^*[n] W_{1k}[n] = \delta_{mk}$$

has been enforced, and $\rho_{mk}$ is the correlation between the $m^{th}$ code of the first base station 101 and the $k^{th}$ code of the second base station 102 that includes the effects of the PN covers:

$$\rho_{mk} = \sum_{n=1}^{N} W_{1m}^*[n] P_1^*[n] P_2[n] W_{2k}[n].$$

Symbol estimates $\tilde{a}_{1m}[l]$ for the $m^{th}$ user signal from the first base station 101 are $$\tilde{a}_{1m}[l] = c_1^* \hat{a}_{1m}[l] = |c_1|^2 a_{1m}[l] +$$

$$c_1^* c_2 \sum_{k=1}^{K_2} \rho_{mk} (a_{2k}[l] - \lambda_{2k}(\tilde{a}_{2k}[l]) \tilde{a}_{2k}[l]) + c_1^* \sum_{n=1}^{N} W_{1m}^*[n] P_1^*[n] u[n]$$

The post-processed SINR for user m is given by $$SINR_m = \frac{E_{1m} |c_1|^4}{|c_1^* c_2|^2 \sum_{k=1}^{K_2} E|\rho_{mk}|^2 E \left| a_{2k} - \lambda_{2k}(\tilde{a}_{2k}) \tilde{a}_{2k} \right|^2 + |c_1|^2 \sigma_w^2}$$

where the noise $$w[l] = \sum_{n=1}^{N} W_{1m}^*[n] P_1^*[n] u[n]$$

is modeled as a complex random variable with zero mean and variance $\sigma_w^2$, and $E_{1m}$ is the expected value of $|a_{1m}|^2$.

The post-processed SINR is maximized by minimizing the expectation terms per subchannel (e.g. Walsh channel). This is accomplished by decomposing the function $\lambda_{2k}(\tilde{a}_{2k})$ into its real and imaginary components and differentiating with respect to each component. The minimizing function is the real scalar weighting $\lambda_{2k} \tilde{a}_{2k}$.

The symbol estimates $\tilde{a}_{2k}$ may be assumed to be uncorrelated symbol estimates, which have mean $a_{2k}$ and variance $\sigma_{2k}^2$. The post-processed $SINR_m$ for a particular subchannel m may be maximized by selecting weights for the other subchannels as $$\lambda_{2k} = \frac{E_{2k}}{E_{2k} + \sigma_{2k}^2} = \frac{E_{2k}}{E|\tilde{a}_{2k}|^2} = \frac{E|\tilde{a}_{2k}|^2 - \sigma_{2k}^2}{E|\tilde{a}_{2k}|^2} = \frac{SINR_{2k}^{(1)}}{SINR_{2k}^{(1)} + 1},$$

where $E_{2k} = E|a_{2k}|^2$ is the average energy of subchannel k for source 2, $E|\tilde{a}_{2k}|^2 = E_{2k} + \sigma_{2k}^2$, and $$SINR_{2k}^{(1)} = \frac{E_{2k}}{\sigma_{2k}^2}$$

is the pre-processed SINR.

If $E_{2k}$ is known, the soft weight $\lambda_{2k}$ may be estimated as $$\lambda_{2k} = \frac{E_{2k}}{avg(|\tilde{a}_{2k}|^2)},$$

where avg(.) denotes an average of the variable (.) over a sequence of symbol transmissions. This average may be quite general, and it may be based on prior knowledge or probability models for $E_{2k}$ and/or $\sigma_{2k}^2$.

If $E_{2k}$ is unknown and $\sigma_{2k}^2$ is known, then $\lambda_{2k}$ may be estimated as $$\hat{\lambda}_{2k} = \max\left(0, \frac{avg(|\tilde{a}_{2k}|^2) - \sigma_{2k}^2}{avg(|\tilde{a}_{2k}|^2)}\right).$$

If $\hat{\lambda}_{2k}$ is quantized to zero or one, such as for selecting active subchannels, then $\hat{\lambda}_{2k}$ is $$\hat{\lambda}_{2k} = \begin{cases} 1, & avg(|\tilde{a}_{2k}|^2)/\sigma_{2k}^2 > z \\ 0, & \text{otherwise} \end{cases}$$

where z is a predetermined threshold value. In one embodiment of the invention, the threshold value z=2 may be used.

If neither $E_{2k}$ nor $\sigma_{2k}^2$ is known, then $\sigma_{2k}^2$ may be estimated from another subchannel having a common value $\sigma_{2m}^2 m = \sigma_{2k}^2$, known $E_{2m}$, and known symbols. Then $\lambda_{2k}$ may be estimated as $$\hat{\lambda}_{2k} = \max\left(0, \frac{avg(|\tilde{a}_{2k}|^2) - avg(\tilde{\sigma}_{2k}^2)}{avg(|\tilde{a}_{2k}|^2)}\right)$$

or with a corresponding quantized version. In some cases, $avg(\tilde{\sigma}_{2k}^2)$ can be obtained from $avg(\tilde{\sigma}_{2m}^2)$ as an estimate of $$\sigma_{2m}^2 = E|\tilde{a}_{2m} - \sqrt{E_{2m}} a_{2m}|^2,$$

where $a_{2m}$ is a known symbol on a pilot channel. Similarly, other channels having known values of $a_{2m}$ and $$\sqrt{E_{2m}}$$

may be used.

If there is prior information about the distribution of $E_{2k}$, then $\lambda_{2k}$ may be estimated as the posterior mean, given a sequence of symbol estimates $\{\tilde{a}_{2k}[l], l=1,2,\ldots,L\}$:

$$\hat{\lambda}_{2k} = E[\lambda_{2k} \mid |\tilde{a}_{2k}|^2[l], l=1,2,\ldots,L]$$

The expectation is over the posterior distribution of $E_{2k}$, given the sequence $$\{\tilde{a}_{2k}^2[l]\}.$$

When the posterior mean is intractable to compute, it may be numerically approximated to produce estimates of $$\lambda_{2k} = E|a_{2k}|^2/(E|a_{2k}|^2 + \sigma_{2k}^2)$$

that are companded versions of $$|\tilde{a}_{2k}|^2/(|\tilde{a}_{2k}|^2 + \sigma_{2k}^2)$$

or companded versions of $$(|\tilde{a}_{2k}|^2 - \sigma_{2k}^2)/|\tilde{a}_{2k}|^2.$$

In some embodiments, hard decisions may be made for the pre-processed symbol estimates when $\lambda_{2k}$ exceeds a predetermined threshold. The derivation for the SINR in such embodiments is described in the co-pending application, entitled "Soft-weighted subtractive interference cancellation systems," which is hereby incorporated by reference.

Some embodiments may employ weighted soft decisions on some subchannels and hard decisions on others. In one such embodiment, all subchannels having a pre-processed SINR[1] between two predetermined thresholds employ soft weighted (e.g., companded) estimates for interference synthesis. Subchannels having values of SINR[1] below the lower threshold may be zeroed. Subchannels having values of SINR[1] above the upper threshold may be hard-coded to a nearest constellation point (i.e., hard decisions are used). A CDMA2000 system in which symbols are drawn from a single QPSK constellation may use a combination of soft and hard decisions based on predetermined thresholds. However, in a system where W-CDMA and HSDPA coexist, constellations for various users may differ. Thus, the constellations of interfering users are typically unknown at the receiver, making hard decisions impractical, unless constellation classification is performed per user. However, the estimation of $E_{2k} + \sigma_{2k}^2$ remains unchanged. Other embodiments may quantize the weighting of soft estimates.

Figure 2A:
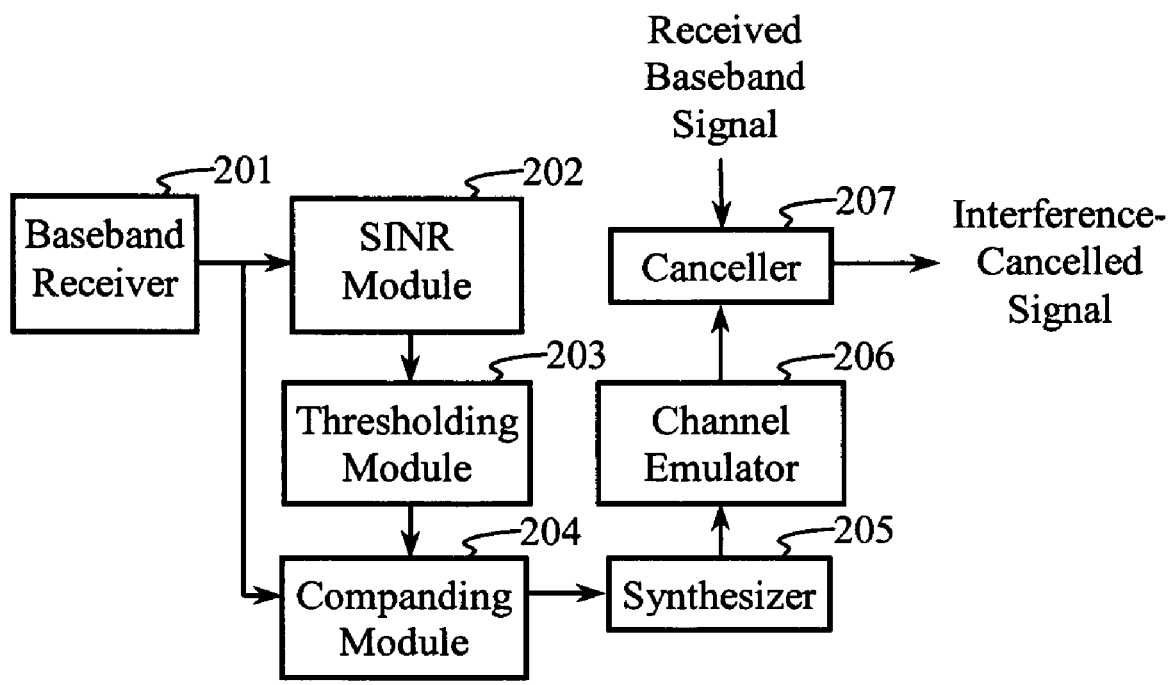
FIG. 2A is a block diagram of an interference-cancelling circuit, which may be configured for removing interference from a predetermined multipath component.

FIG. 2A is a block diagram that shows a receiver embodiment of the invention that may be employed in a CDMA system. The receiver includes a baseband receiver 201 coupled to an SINR-estimation module 202 and a companding module 204. A thresholding module 203 is coupled between the SINR-estimation module 202 and the companding module 204. The companding module 204 is coupled to an interference synthesizer 205, followed by a channel emulator 206, and a canceller 207.

The baseband receiver 201 provides pre-processed symbol estimates for subchannels of a received baseband signal. For example, a rake receiver may be employed for producing pre-processed estimates for all of the received CDMA subchannels. In another embodiment, symbol estimates may be chosen per rake finger. In some embodiments, the baseband receiver 201 may comprise an equalizer receiver.

The pre-processed estimates are coupled into the SINR-estimation module 202, which estimates a pre-processed SINR[1] for each subchannel. SINR estimates may be extracted from EVMs. Alternatively, the noise-plus-interference variance may be measured on a representative subchannel (e.g., a pilot channel) and used for all subchannels. The value avg $$(|\tilde{a}_{2k}|^2)$$

may be used to estimate $E_{2k} + \sigma_{2k}^2$ directly without resolving onto a constellation.

The thresholding module 203 compares estimated SINR to a predetermined threshold for determining whether soft or hard decisions are to be used for generating interference-symbol estimates for each subchannel. The companding module 204 generates the hard decisions and/or weighted soft decisions for each pre-processed symbol estimate. The companding module 204 may employ filtering for each subchannel to estimate user amplitudes, and amplitude scaling may be employed prior to hard decisions. The estimated SINR may be used to generate weights used to soft weight symbol estimates for each subchannel.

The interference synthesizer 205 performs source-specific operations on the symbol estimates (which may be soft and/or hard symbol estimates) to produce a synthesized interference signal. For example the interference synthesizer 205 may perform an Inverse Fast Walsh Transform (IFWT) to respread user symbol estimates, followed by a PN covering that provides for PN/Scrambling cover codes. A transmitter pulse-shaping filter may be used to shape the scrambled, code-multiplexed signal.

The channel emulator 206, which may optionally be part of the interference synthesizer 205, adds channel distortions to the synthesized interference signal. In one embodiment, a path of interest is selected from a multipath signal. For example, the first signal path 111 from base station 101 corresponding to a first finger of a rake receiver may be denoted as the path of interest. In this case, the channel emulator 206 may convolve the synthesized interference with a channel profile that excludes the channel effects corresponding to the first finger (i.e., the first signal path 111). This enables a canceller (e.g., canceller 207) to remove effects of other multipath components from the path of interest (i.e., signal path 111). Receiver embodiments of the invention may be configured to remove any number of multipath components from a path of interest. Furthermore, when multiple transmit sources are present, signals from sources other than the source corresponding to the path of interest may be removed.

The canceller 207 may include a subtractive canceller or a projective canceller configured to remove interference from the received baseband signal, which may be obtained from a receiver pulse-shaping filter (not shown). Thus, the interference synthesizer 205 or the channel emulator 206 may optionally emulate the effects of receiver pulse-shaping for the synthesized interference.

In some embodiments of the invention, the canceller 207 may provide for a scale factor $\alpha$ to adjust the amount of interference that is removed. In some cases, the received signal and the synthesized interference are not to scale. For example, Walsh Codes and PN codes typically are not normalized. Walsh stripping and Walsh insertion together introduce a scale equal to the code length N, and PN code stripping and insertion together introduce an additional factor of 2. Furthermore, MRC combining for M paths results in a scaling factor given by $$\eta = \sum_{i=1}^{M} |b_i|^2,$$

where $b_i$ is a weighting factor employed for an $i^{th}$ finger. For example, $$|b_i|^2 = |c_i|^2$$

or $$|b_i|^2 = |c_i|^2 / \sigma^2.$$

The normalizing factor in this case is $$\alpha = \frac{1}{2N\eta},$$

and the interference-cancelled signal is given by $$r_c = r - \alpha s.$$

The term $\alpha$ may also represent a projective cancellation factor that accounts for path correlations. An example of $\alpha$ for such a case is given by $$\alpha s = P_s r, \quad \alpha = \frac{s^H r}{s^H s},$$

where $P_s$ is a projection operator $P_s = ss^H / s^H s$.

Interference-cancelled signals output by the canceller 207 may be coupled to one or more rake fingers. In an exemplary rake receiver configured to process four multipath components, interference-cancelled signals in which the effects of a third and a fourth path are removed may be coupled to fingers configured for processing first and second multipath components. A comparator (not shown) may optionally be employed for selecting one of the interference-cancelled signal and the uncancelled signal for processing by a rake receiver.

Figure 2B:
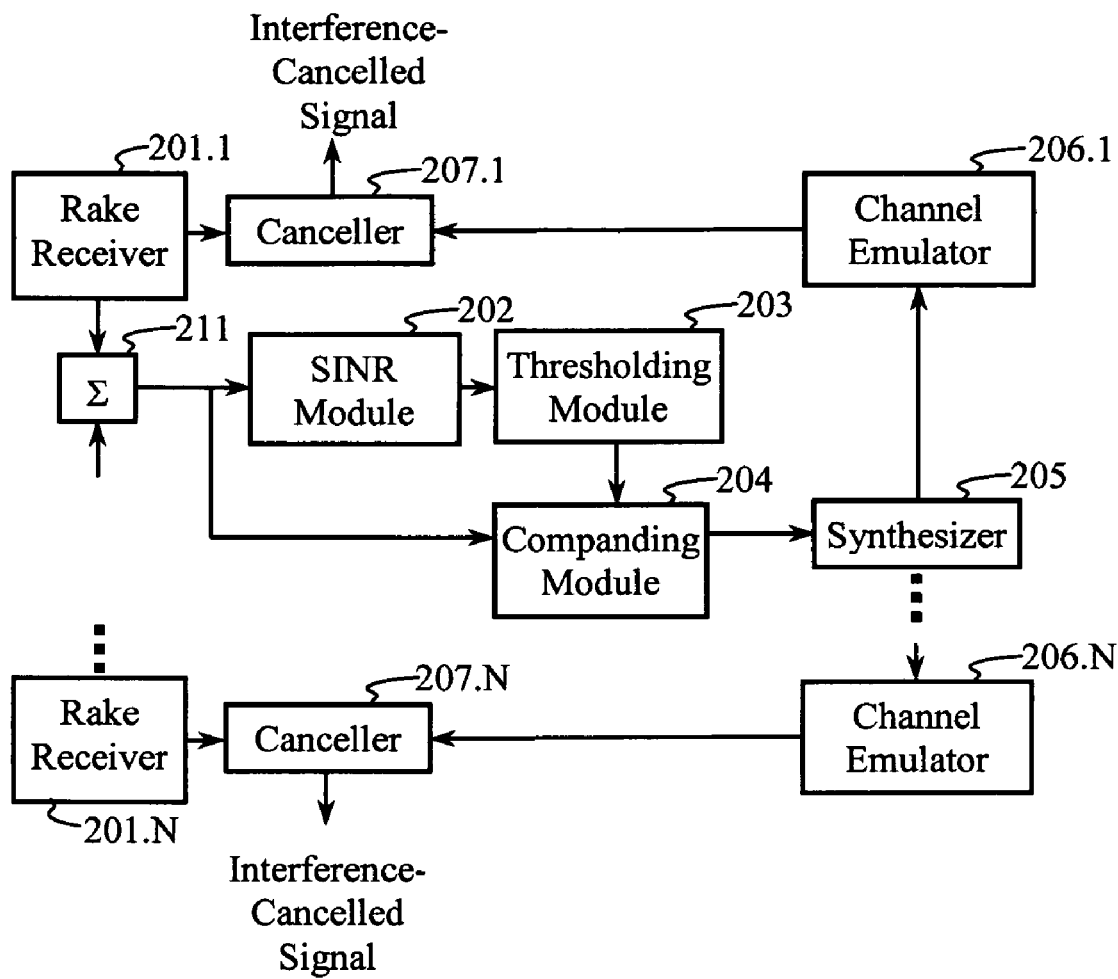
FIG. 2B is a block diagram showing an embodiment of an interference-cancelling circuit configured to cancel interference in a receiver employing antenna diversity.

Embodiments of the invention may be configured for receivers having more than one receive antenna. For example, in FIG. 2B, each of a plurality N of rake receivers 201.1-201.N corresponding to a different receive antenna (not shown) may include an interference canceller 207.1-207.N, respectively. A generalized combiner may be used to combine paths that are common to two or more receive antennas. A combiner 211 may perform maximal ratio combining across the rake 201.1-201.N fingers. Alternative types of combining may be performed. Pre-processed soft estimates are output by the combiner 211 and used to produce synthesized interference, such as described previously. The synthesized interference is coupled to a plurality of channel emulators 206.1-206.N, wherein each channel emulator 206.1-206.N has an associated rake receiver 201.1-201.N.

In an exemplary two-antenna system configured for receiving two multipath components from a single transmit source, a first channel emulator produces two interference signals corresponding to the two paths received by the first antenna. Similarly, a second channel emulator produces two interference signals corresponding to the two paths received by the second antenna. In this case, the receiver may include four rake fingers, each matched to one of the four paths. The first finger may be assigned to the signal received by the first antenna, wherein interference due to the second path is removed via subtractive or projective cancellation. The second finger may be assigned to the signal received by the first antenna wherein the interference due to the first path is removed. Similarly, the third and fourth fingers may be matched to the multipath components received by the second receive antenna.

In "data optimized" CDMA, such as High-Speed Downlink Packet Access (HSDPA), multiple subchannels transmitting high data rates have the same frequency-selective fade and each of these coded subchannels has the same transmission amplitude. These subchannels coexist with voice channels, which have a lower data rate. Unlike the high-rate subchannels, these low-rate channels may have different amplitudes. In such systems, only one weight may be calculated for each of the K subchannels carrying high data rates. Signal amplitudes may be averaged over time and/or across subchannels, and the noise power may also be averaged over subchannels to obtain a single SINR estimate. In one embodiment of the invention, an SINR estimate may be compared to a predetermined threshold for determining whether to perform hard decisions, weighted soft decisions, or zeroing for all of the high data rate subchannels.

Figure 3:
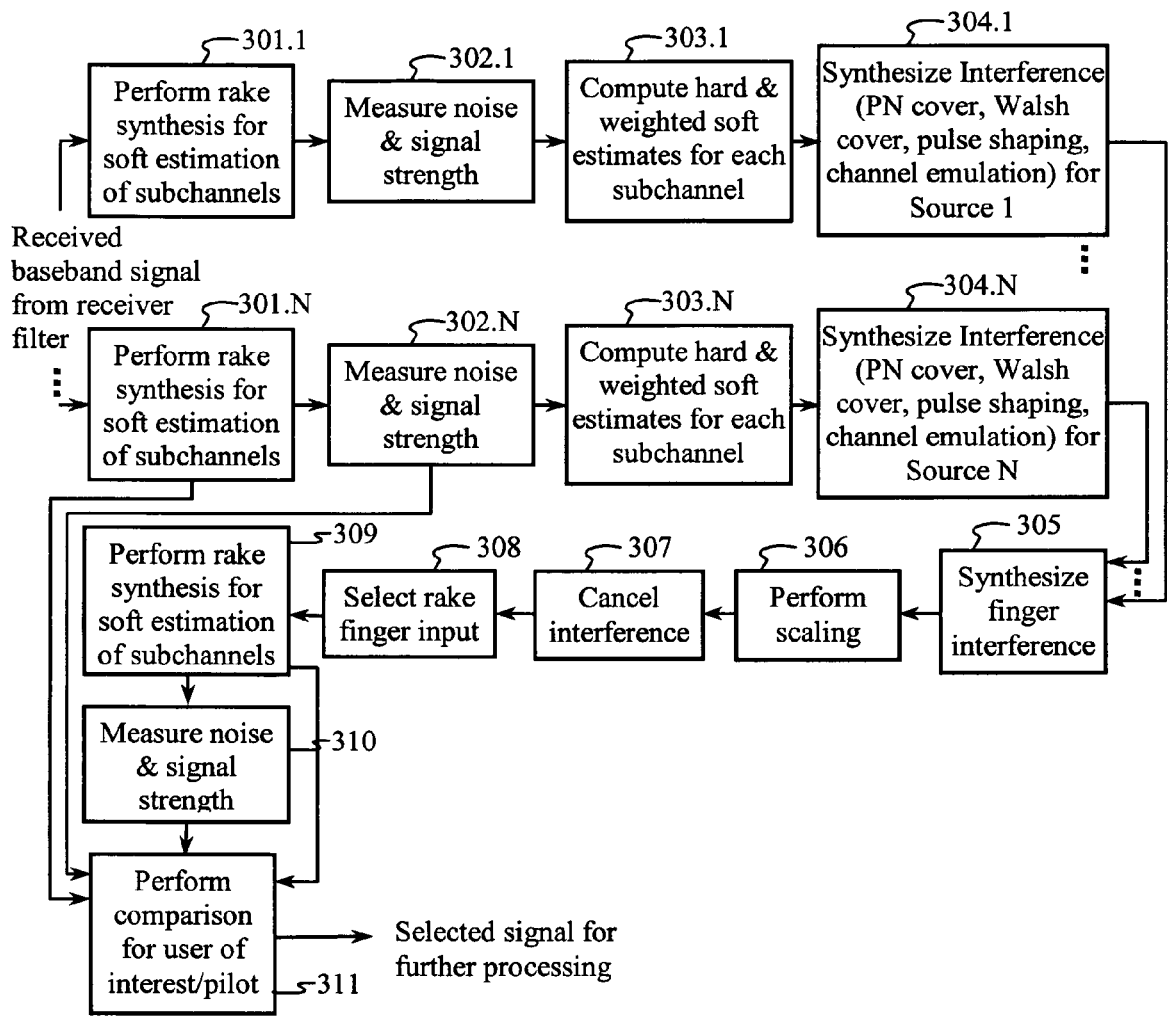
FIG. 3 is a flow chart that illustrates a cancellation method in accordance with an embodiment of the invention.

FIG. 3 is a flow chart that illustrates a cancellation method in accordance with an embodiment of the invention. Rake synthesis 301.1 processes a received baseband signal to produce soft symbol estimates for data symbols modulated on subchannels by a first source (e.g., a first base station). Similarly, rake synthesis 301.N produces soft symbol estimates for data symbols modulated on subchannels by an $N^{th}$ source. The rake synthesis steps 301.1-301.N may optionally be cross-coupled if source diversity is present for at least some of the subchannels, such as may typically occur during a soft hand over. For each source, an SINR estimate or a vector magnitude is made from the soft symbol estimates 302.1-302.N. These measurements are used to determine the reliability of the soft symbol estimates. Based on this reliability determination, either a hard decision or a weighted soft-decision is produced for each soft symbol estimate 303.1-303.N. This companding process 303.1-303.N may implement subchannel selection, such as by discarding subchannels that have a signal energy that falls below a predetermined threshold. Interference synthesis (such as providing for PN covering, Walsh covering, pulse shaping, and channel emulation) 304.1-304.N is performed to synthesize interference received from each source (i.e., each base station and/or multipath).

Interference for a particular rake finger is synthesized 305 using synthesized multipath signals from each of the first source to the $N^{th}$ source. Scaling 306 may optionally be used to scale interference received from the different sources. Some form of interference cancellation 307 (such as subtractive cancellation, weighted subtractive cancellation, projective cancellation, or weighted projective cancellation) is provided for cancelling interference from a predetermined path of interest. Rake finger input selection 308 is performed to select between an interference-cancelled signal and the original received baseband signal (depending on which signal has the highest value of estimated SINR or an alternative figure of merit) prior to coupling the resulting selected signal into a rake finger. Rake synthesis 309 produces soft estimates for each subchannel. Signal and noise powers are measured 310, followed by another selection process 311 configured to select either soft estimates produced by some combination of rake synthesis 301.1 to 301.N or soft estimates produced by rake synthesis 309. The selected signals may be output for further processing.

Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

Figure 4A:
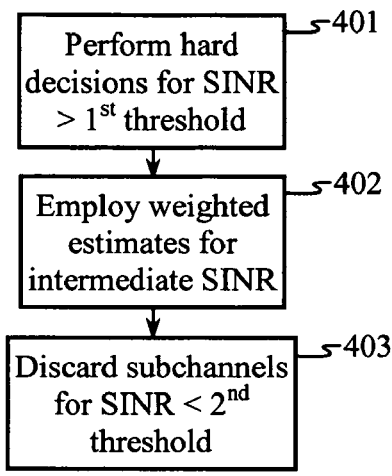
FIG. 4A illustrates a method for estimating subchannel symbols as part of an interference-cancellation technique.

FIG. 4A illustrates a method for estimating subchannel symbols as part of an interference-cancellation technique. For a given pre-processed SINR, hard decisions are employed if the SINR is higher than a first predetermined threshold 401. Weighted soft decisions may be employed for an intermediate range of SINRs defined by an upper bound (e.g., the first predetermined threshold) and a lower bound 402 (e.g., a second predetermined threshold). Subchannel symbol values may be discarded (e.g., set to zero) if the pre-processed SINR falls below the second predetermined threshold 403. In a related embodiment, an interference cancellation circuit may be turned off if the measured SINR falls below a predetermined threshold, since, in some embodiments of the invention, it is known that interference cancellation may not be as useful as power conservation at lower pre-processed SINRs.

Figure 4B:
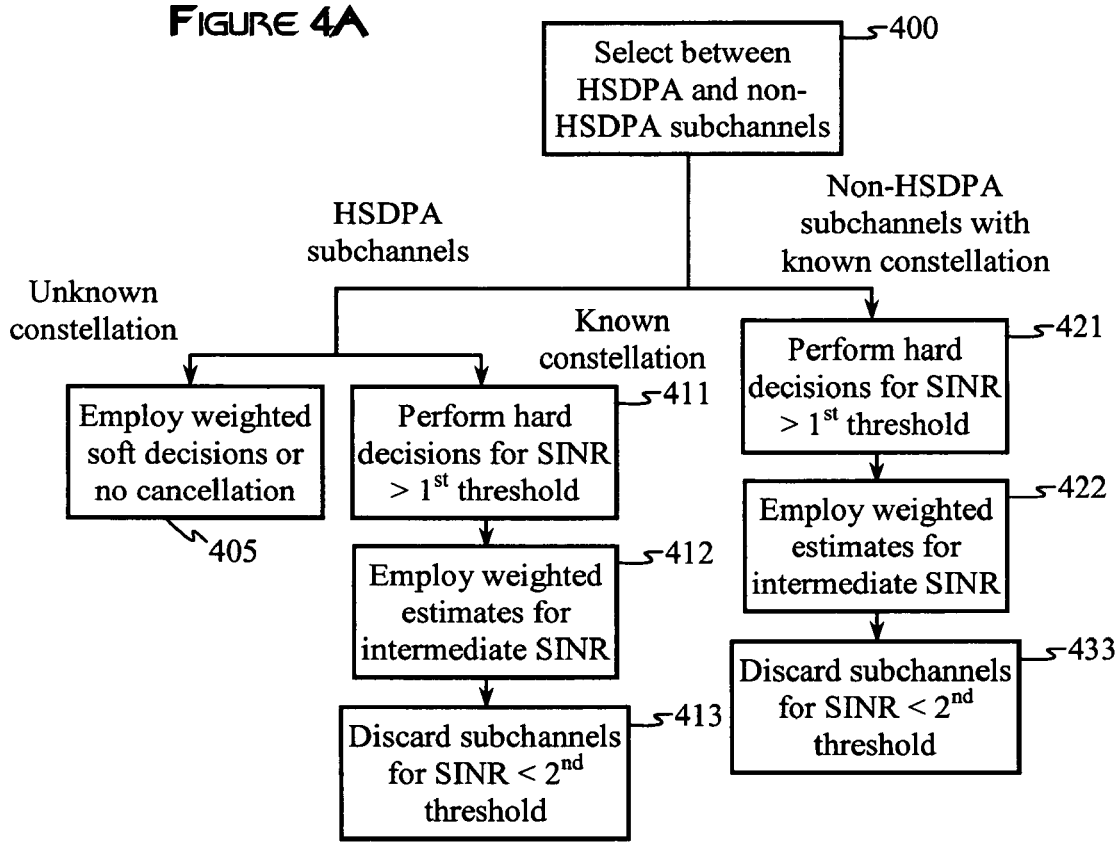
FIG. 4B illustrates a method for estimating subchannel symbols for a system (e.g., an HSDPA system) that employs different signal constellations and spreading codes for different data rates.

FIG. 4B illustrates a method for estimating subchannel symbols for a given system that employs different signal constellations corresponding to different data rates. A system identification 400 is performed for each subchannel. For example, system identification 400 may distinguish between HSDPA subchannels and non-HSDPA subchannels, which have a lower data rate. For subchannels (e.g., HSDPA subchannels) having a higher data rate, some predetermined strategy may be used to estimate subchannel symbols based on whether the symbol constellation for those subchannels is known or unknown. Weighted soft estimates may be employed or cancellation may be bypassed for HSDPA subchannels in which the constellation is unknown. If the constellation is known, hard decisions 411, weighted soft decisions 412, and/or no cancellation 413 may be performed. For non-HSDPA (e.g., WCDMA) subchannels, it is assumed that the constellation is known. Thus, hard decisions 421, weighted soft decisions 422, and/or no cancellation 423 may be performed.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A CDMA receiver, comprising:
an signal-to-interference-and-noise ratio (SINR)-estimation module in a receiver, the SINR estimation module configured for producing a plurality of pre-processed SINR estimates corresponding to a plurality of pre-processed symbol estimates from a received multipath signal,
a thresholding module configured for comparing each of the plurality of pre-processed SINR estimates to a predetermined threshold for determining whether to employ a weighted soft decision or a hard decision,
a companding module configured for generating the weighted soft decision or the hard decision for each of the plurality of pre-processed symbol estimates,
a synthesizer configured for producing a synthesized interference signal from an output of the companding module, wherein the synthesizer comprises a channel emulator configured for providing channel distortions to the synthesized interference signal, and
a canceller configured for producing at least one interference-cancelled signal from an output of the channel emulator.

2. The receiver recited in claim 1, wherein the SINR-estimation module is configured for producing the plurality of pre-processed SINR estimates by averaging symbol amplitudes over at least one of a set of parameters, the set of parameters including time and a plurality of subchannels.

3. The receiver recited in claim 1, wherein the thresholding module is configured for determining an estimated SINR below which weighted soft decisions provide better performance than hard decisions, and above which hard decisions provide better performance than weighted soft decisions.

4. The receiver recited in claim 1, wherein the thresholding module is configured for determining a second cutoff SINR, below which corresponding pre-processed symbol estimates are set to zero.

5. The receiver recited in claim 1, wherein the thresholding module is configured for determining an estimation strategy based on whether subchannel constellations are known.

6. The receiver recited in claim 1, wherein the companding module is configured for producing at least one weight expressed by an estimate of $$\frac{SINR_k^{(1)}}{SINR_k^{(1)} + 1},$$

where $SINR_k^{(1)}$ is a pre-processed signal-to-interference-and-noise ratio for a user or subchannel k.

7. The receiver recited in claim 6, wherein $SINR_k^{(1)}$ is estimated via a function of the plurality of soft symbol estimates.

8. The receiver recited in claim 1, further comprising a channel emulator configured to perform channel emulation.

9. The receiver recited in claim 1, wherein the canceller is configured to perform scaling.

10. The receiver recited in claim 1, wherein the canceller is configured to perform at least one of subtractive cancellation, weighted subtractive cancellation, projective cancellation, and weighted projective cancellation.

11. The receiver recited in claim 1, further comprising a rake combiner configured to perform maximal ratio combining across a plurality of rake fingers.

12. The receiver recited in claim 11, wherein the SINR-estimation module is coupled to the Rake combiner.

13. The receiver recited in claim 1 configured to operate in at least one of a handset and a base station.

14. A method of receiving a CDMA signal, comprising:
providing for producing in a receiver a plurality of pre-processed SINR estimates corresponding to a plurality of pre-processed symbol estimates from a received multipath signal,
providing for comparing each of the plurality of pre-processed SINR estimates to a predetermined threshold for determining whether to employ a weighted soft decision or a hard decision,
providing for generating the weighted soft decision or the hard decision for each of the plurality of pre-processed symbol estimates to produce at least one interference-symbol estimate,
providing for producing a synthesized interference signal from at least one of the at least one interference-symbol estimate,
providing for emulating channel distortions in the synthesized interference signal, and
providing for producing at least one interference-cancelled signal from the emulated synthesized interference signal.

15. The method recited in claim 14, wherein providing for producing a plurality of pre-processed SINR estimates is configured for producing the plurality of pre-processed SINR estimates by averaging symbol amplitudes over at least one of a set of parameters, the set of parameters including time and a plurality of subchannels.

16. The method recited in claim 14, wherein providing for comparing is configured for determining an SINR below which weighted soft decisions provide better performance than hard decisions, and above which hard decisions provide better performance than weighted soft decisions.

17. The method recited in claim 14, wherein providing for comparing is configured for determining a second cutoff SINR, below which corresponding pre-processed symbol estimates are set to zero.

18. The method recited in claim 14, wherein providing for comparing is configured for determining an estimation strategy based on whether subchannel constellations are known.

19. The method recited in claim 14, wherein providing for generating the weighted soft decision or the hard decision is configured for producing at least one weight expressed by an estimate of, $$\frac{SINR_k^{(1)}}{SINR_k^{(1)} + 1},$$

where $SINR_k^{(1)}$ is a pre-processed signal-to-interference-and-noise ratio for a user or subchannel k.

20. The method recited in claim 19, wherein $SINR_k^{(1)}$ is estimated via a function of the plurality of soft symbol estimates.

21. The method recited in claim 14, further comprising providing for performing channel emulation.

22. The method recited in claim 14, wherein providing for producing at least one interference-cancelled signal includes providing for scaling.

23. The method recited in claim 14, wherein providing for producing at least one interference-cancelled signal comprises performing at least one of subtractive cancellation, weighted subtractive cancellation, projective cancellation, and weighted projective cancellation.

24. The method recited in claim 14, further comprising providing for maximal ratio combining across a plurality of rake fingers.

25. The receiver recited in claim 24, wherein providing for producing a plurality of pre-processed SINR estimates includes receiving the plurality of pre-processed symbol estimates from a Rake combiner.

26. A chipset configured to perform the receiving method recited in claim 14.

27. A digital computer system programmed to perform the method recited in claim 14.

28. A computer-readable medium storing a computer program implementing the method of claim 14.

29. A base station configured to perform the method of claim 14.

30. A handset configured to perform the method of claim 14.

31. A CDMA receiver, comprising:
a means for determining a pre-processed SINR estimate for each of a plurality of pre-processed symbol estimates corresponding to a plurality of subchannels,
a means for determining whether to use weighted soft decisions or hard decisions for each subchannel,
a means for generating at least one interference-symbol estimate, wherein each of the at least one interference-symbol estimate comprises a hard decision or a weighted soft decision of a corresponding pre-processed symbol estimate, and
a means for producing an interference-cancelled signal from a received baseband signal and the at least one interference-symbol estimate,
wherein the means for producing an interference-cancelled signal comprises a means for producing a synthesized interference signal from the at least one interference-symbol estimate, and
wherein the means for producing a synthesized interference signal includes a means for emulating channel distortions in the synthesized interference signal.

32. The receiver recited in claim 31, further comprising a means for determining at least one pre-processed SINR threshold.

33. The receiver recited in claim 32, wherein the means for determining the pre-processed SINR threshold is configured for determining an SINR below which weighted soft decisions provide better performance than hard decisions, and above which hard decisions provide better performance than weighted soft decisions.

34. The receiver recited in claim 32, wherein the means for determining the pre-processed SINR threshold includes a means for determining a cutoff SINR, below which the processed symbol estimates are set to zero.

35. The receiver recited in claim 31, further comprising a means for generating at least one weight for weighting at least one of the plurality of soft symbol estimates.

36. The receiver recited in claim 35, wherein the at least one weight is expressed by an estimate of $$\frac{SINR_k^{(1)}}{SINR_k^{(1)} + 1},$$

where $SINR_k^{(1)}$ is a pre-processed signal-to-interference-and-noise ratio for a user or subchannel k.

37. The receiver recited in claim 31, wherein the means for determining the SINR estimate is configured for estimating an SINR in each of the plurality of subchannels.

38. The receiver recited in claim 31, wherein the means for producing an interference-cancelled signal is configured for performing scaling.

39. The receiver recited in claim 31, wherein the means for producing an interference-cancelled signal is configured to perform at least one of subtractive cancellation, weighted subtractive cancellation, projective cancellation, and weighted projective cancellation.

40. The receiver recited in claim 31, wherein the means for determining the SINR estimate is coupled to a means for producing pre-processed symbol estimates corresponding to a received baseband signal.

41. The receiver recited in claim 31, wherein the means for determining the SINR estimate is configured for averaging amplitudes of the plurality of pre-processed symbol estimates over at least one of a set of parameters, the set of parameters including time and a plurality of subchannels.

42. The receiver recited in claim 31, wherein the means for determining whether to use weighted soft decisions or hard decisions is further configured for determining an estimation strategy based on whether subchannel constellations are known.

43. A chipset, comprising:
an SINR-estimation module in a chipset, the SINR-estimation module configured for producing a plurality of pre-processed SINR estimates corresponding to a plurality of pre-processed symbol estimates from a received multipath signal,
a thresholding module configured for comparing each of the plurality of pre-processed SINR estimates to a predetermined threshold for determining whether to employ a weighted soft decision or a hard decision,
a companding module configured for generating the weighted soft decision or the hard decision for each of the plurality of pre-processed symbol estimates,
a synthesizer configured for producing a synthesized interference signal from an output of the companding module, wherein the synthesizer comprises a channel emulator configured for providing channel distortions to the synthesized interference signal, and
a canceller configured for producing at least one interference-cancelled signal from an output of the channel emulator.

44. The chipset recited in claim 43, wherein the SINR-estimation module is configured for producing the plurality of pre-processed SINR estimates by averaging symbol amplitudes over at least one of a set of parameters, the set of parameters including time and a plurality of subchannels.

45. The chipset recited in claim 43, wherein the thresholding module is configured for determining an SINR below which weighted soft decisions provide better performance than hard decisions, and above which hard decisions provide better performance than weighted soft decisions.

46. The chipset recited in claim 43, wherein the thresholding module is configured for determining a second cutoff SINR, below which corresponding pre-processed symbol estimates are set to zero.

47. The chipset recited in claim 43, wherein the thresholding module is configured for determining an estimation strategy based on whether subchannel constellations are known.

48. The chipset recited in claim 43, wherein the companding module is configured for producing at least one weight expressed by an estimate of $$\frac{SINR_k^{(1)}}{SINR_k^{(1)}+1},$$

where $SINR_k^{(1)}$ is a pre-processed signal-to-interference-and-noise ratio for a user or subchannel k.

49. The chipset recited in claim 48, wherein $SINR_k^{(1)}$ is estimated via a function of the plurality of soft symbol estimates.

50. The chipset recited in claim 43, further comprising a channel emulator configured to perform channel emulation.

51. The chipset recited in claim 43, wherein the canceller is configured to perform scaling.

52. The chipset recited in claim 43, wherein the canceller is configured to perform at least one of subtractive cancellation, weighted subtractive cancellation, projective cancellation, and weighted projective cancellation.

53. The chipset recited in claim 43, further comprising a rake combiner configured to perform maximal ratio combining across a plurality of rake fingers.

54. The chipset recited in claim 53, wherein the SINR-estimation module is coupled to the Rake combiner.

55. The chipset recited in claim 43 configured to operate in at least one of a handset and a base station.

56. A handset, comprising:
- an SINR-estimation module in a handset, the SINR-estimation module configured for producing a plurality of pre-processed SINR estimates corresponding to a plurality of pre-processed symbol estimates from a received multipath signal,
- a thresholding module configured for comparing each of the plurality of pre-processed SINR estimates to a predetermined threshold for determining whether to employ a weighted soft decision or a hard decision,
- a companding module configured for generating the weighted soft decision or the hard decision for each of the plurality of pre-processed symbol estimates,
- a synthesizer configured for producing a synthesized interference signal from an output of the companding module, wherein the synthesizer comprises a channel emulator configured for providing channel distortions to the synthesized interference signal, and
- a canceller configured for producing at least one interference-cancelled signal from an output of the channel emulator.

57. The handset recited in claim 56, wherein the SINR-estimation module is configured for producing the plurality of pre-processed SINR estimates by averaging symbol amplitudes over at least one of a set of parameters, the set of parameters including time and a plurality of subchannels.

58. The handset recited in claim 56, wherein the thresholding module is configured for determining an SINR below which weighted soft decisions provide better performance than hard decisions, and above which hard decisions provide better performance than weighted soft decisions.

59. The handset recited in claim 56, wherein the thresholding module is configured for determining a second cutoff SINR, below which corresponding pre-processed symbol estimates are set to zero.

60. The handset recited in claim 56, wherein the thresholding module is configured for determining an estimation strategy based on whether subchannel constellations are known.

61. The handset recited in claim 56, wherein the companding module is configured for producing at least one weight expressed by an estimate of $$\frac{SINR_k^{(1)}}{SINR_k^{(1)}+1},$$

where $SINR_k^{(1)}$ is a pre-processed signal-to-interference-and-noise ratio for a user or subchannel k.

62. The handset recited in claim 61, wherein $SINR_k^{(1)}$ is estimated via a function of the plurality of soft symbol estimates.

63. The handset recited in claim 56, further comprising a channel emulator configured to perform channel emulation.

64. The handset recited in claim 56, wherein the canceller is configured to perform scaling.

65. The handset recited in claim 56, wherein the canceller is configured to perform at least one of subtractive cancellation, weighted subtractive cancellation, projective cancellation, and weighted projective cancellation.

66. The handset recited in claim 56, further comprising a rake combiner configured to perform maximal ratio combining across a plurality of rake fingers.

67. The handset recited in claim 66, wherein the SINR-estimation module is coupled to the Rake combiner.

68. The handset recited in claim 56 configured to operate in at least one of a handset and a base station.

\* \* \* \* \*